United States Patent [19]

Slotte

[11] Patent Number: 5,583,087
[45] Date of Patent: Dec. 10, 1996

[54] METHOD FOR IMPREGNATING CATALYST SUPPORT WITH PLATINUM

[75] Inventor: Thomas Slotte, Oulu, Finland

[73] Assignee: Kemira Oy, Espoo, Finland

[21] Appl. No.: 302,769

[22] PCT Filed: Mar. 18, 1993

[86] PCT No.: PCT/FI93/00099

§ 371 Date: Sep. 19, 1994

§ 102(e) Date: Sep. 19, 1994

[87] PCT Pub. No.: WO93/18855

PCT Pub. Date: Sep. 30, 1993

[30] Foreign Application Priority Data

Mar. 19, 1992 [FI] Finland ................................ 921197

[51] Int. Cl.$^6$ ................ B01J 23/40; B01J 23/42; B01J 23/56
[52] U.S. Cl. .................. 502/327; 502/326; 502/332; 502/334; 502/339
[58] Field of Search ........................... 502/326, 327, 502/332, 334, 339

[56] References Cited

U.S. PATENT DOCUMENTS 4,082,699 4/1978 Petrow et al. .
4,837,193 6/1989 Akizuki et al. ................ 502/242

FOREIGN PATENT DOCUMENTS

| 0258942 | 3/1988 | European Pat. Off. . |
| 2304351 | 1/1973 | Germany . |
| 2339513 | 8/1973 | Germany . |
| 396213 | 9/1977 | Sweden . |
| 396554 | 9/1977 | Sweden . |
| WO91/18832 | 12/1991 | WIPO . |

Primary Examiner—Asok Pal
Assistant Examiner—E. D. Irzinski
Attorney, Agent, or Firm—Oblon, Spivak, McClelland, Maier & Neustadt, P.C.

[57] ABSTRACT

The invention relates to a method for impregnating alumina-containing catalyst support with platinum. In the method a platinum-containing solution is prepared by using a compound which contains bivalent platinum. The method comprises a stage during which the said platinum-containing solution is oxidized in order to form a solution which contains tetravalent platinum, from which solution platinum is adsorbed on the support.

9 Claims, 4 Drawing Sheets

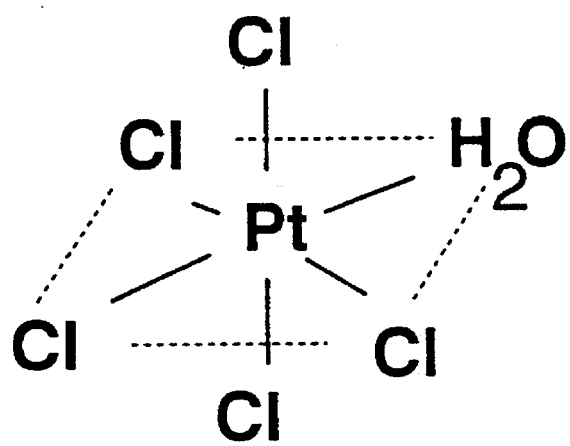
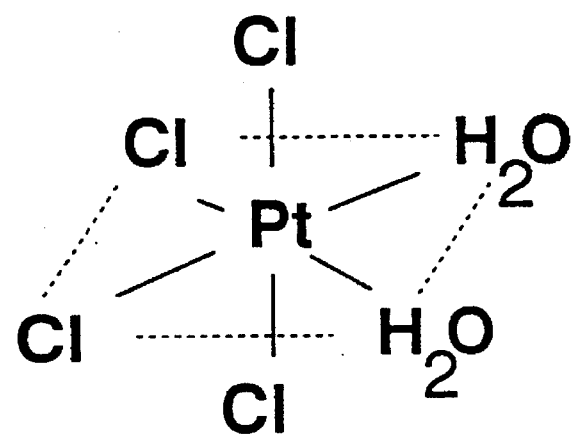
FIG 5
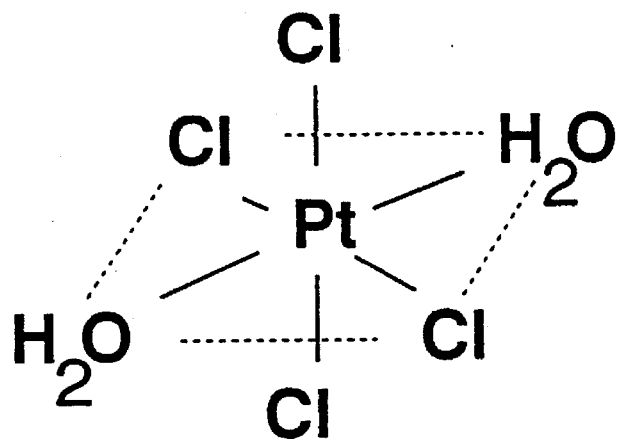

5,583,087

METHOD FOR IMPREGNATING CATALYST SUPPORT WITH PLATINUM

FIELD OF THE INVENTION

The invention relates to a method for impregnating a catalyst support with platinum. The invention also relates to a method for the preparation of a catalyst and to a catalyst prepared by this method.

DESCRIPTION OF THE PRIOR ART

The catalyst has a carrier structure to the surface of which there has been applied a washcoat of a support material. The support used is typically alumina, silica, titanium dioxide, zeolite, or mixtures of these. Additives, such as cerium compounds, improving the thermal durability of the support are additionally used in the support. The support has a large specific surface and it constitutes the surface to which the catalytically active agent is affixed. Noble metals such as platinum, rhodium and palladium are generally used as the catalytically active agent. The purpose of platinum is to catalyze in particular the oxidation of carbon monoxide and hydrocarbons to carbon dioxide. Typically the amount of platinum used in a three-way catalyst per catalyst volume is 0.9–3 g/l.

The noble metal is added to the support by impregnation. The catalyst is dipped or immersed in a solution which contains noble metals. The noble metals will adhere to the surface of the support. After the impregnation the catalyst is first dried at room temperature and thereafter the catalyst is activated, for example by heating in a reducing atmosphere.

Two methods are generally used in noble metal impregnation. These methods are wet impregnation and chemisorption. In wet impregnation a completed honeycomb is dipped in a noble metal solution, whereupon the liquid is absorbed automatically into the honeycomb. Wet impregnation is characterized by a short impregnation period and a high noble-metal concentration in the solutions. Wet impregnation is based on the adsorption of the solution. The result is in this case often an uneven distribution of the noble metals on the surface of the support. In addition, the noble metal is present in the form of large particles, in which case the interface between the gas and the noble metal remains small, i.e. a poor dispersion is obtained. In impregnation based on chemisorption, electric forces are exploited for affixing the noble metal complex to the surface. Chemisorption is characterized by a long impregnation period and a low noble-metal concentration in the solutions. The impregnation is based on the noble metal compounds being chemically bonded to the surface. In this case the noble metal is present on the surface of the support in the form of small particles which are evenly distributed over the surface. Thereby a large interface between the gas and the noble metal is obtained, i.e. the dispersion is high.

In the solution used for the impregnation, platinum has a valence of either 2 or 4. $Pt^{II}$ compounds include $Pt^{II}(NH_3)_4Cl_2$ and $Pt^{II}(NH_3)_4(OH)_2$. Respectively, $Pt^{IV}$ compounds which have been used for impregnation include hexachloroplatinic(IV) acid $H_2Pt^{IV}Cl_6$, and its potassium salt and ammonium salt.

In the working example of FI publication 900516, an aqueous solution was used which contained hexachloroplatinic(IV) acid and rhodium chloride. A catalyst structure which had been coated with a support layer and had thereafter been activated was immersed in this solution. Thereafter it was dried, and the precipitated noble metal salts were reduced by heating in a hydrogen flow.

Lay-open print DE 23 39 513 discloses a method of preparing a catalyst in which a solution containing, for example, $Pt^{II}(NH_3)_4(OH)_2$ was added to a powder containing alumina and ceria. The solution, which had a volume of 151 ml, contained platinum 2.75 g. Thereafter the powder was dried.

If the platinum solution used for impregnation is prepared by using $Pt^{II}(NH_3)_4Cl_2$, chlorides are formed in the solution because in solution form the compound becomes ionized

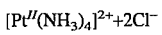
$$[Pt^{II}(NH_3)_4]^{2+} + 2Cl^-$$

A tetrammineplatinum(II) ion and two chloride ions are thereby formed in the solution. If the above-mentioned solution is used for wet impregnation in metallic catalysts, the chloride in the solution is problematic, because it will remain in the support and cause corrosion of the metal foil.

When the chemisorption method is used, the said corrosion problem is in principle not produced with a $Pt^{II}(NH_3)_4Cl_2$ solution, since in this case the chloride is not bound to the platinum complex, in which case it does not become adsorbed by the oxidic support in chemisorption. In experiments performed it has, however, been observed that the chemisorption of the $[Pt^{II}(NH_3)_4]^{2+}$ complex is poor, especially on alumina. In this case, strong tetrammineplatinum(II) solutions have to be used in order to cause a sufficient amount of platinum to be adsorbed by the support. Thereby the chloride concentration in the solution respectively increases, whereupon chloride will be left in the support, owing to the wetting of the support. Thus in practice the use of a $Pt^{II}(NH_3)_4Cl_2$ solution also causes a corrosion problem owing to the poor fixation of the platinum complex formed in the solution to the surface. If, on the other hand, a $Pt^{II}(NH_3)_4(OH)_2$ solution is used, wet impregnation has to be used owing to the poor adhesion of the $[Pt^{II}(NH_3)_4]^{2+}$ complex, and thus the dispersion of the noble metal will be poor.

It has been observed that, if the platinum solution is prepared by using $H_2Pt^{IV}Cl_6$, there will be corrosion problems. It has been suggested as the reason that chlorine-containing complexes are formed in the solution. When such complexes become adsorbed by the support, the chloride is adsorbed along with the complex by the support, whereupon corrosion problems caused by chlorine are produced. The corrosion problems arise during the calcination and reduction-kiln stage and also during the use of the completed catalyst.

On the basis of what has been stated above, the problems generally involved with the platinum compounds used for platinum impregnation are, on the one hand, the corrosion problems due to the chlorides present in them and, on the other hand, the poor adhesion of chloride-free platinum complexes by chemisorption to the surface of the support.

SUMMARY OF THE INVENTION

It is an object of the invention to provide a platinum impregnation method by means of which a sufficient amount of platinum is introduced into the support and a good dispersion of platinum is achieved and no corrosion problems are produced. These objects are achieved by the method according to the invention, claim 1.

According to the invention there has thus been provided a method for the impregnation of catalyst support with platinum, the catalyst support containing alumina, in which method a platinum-containing solution is prepared by using a compound which contains bivalent platinum, and the solution is there-after oxidized in order to form a solution which contains tetravalent platinum and from which the platinum is caused to be adsorbed by the support.

According to the invention there has also been provided a method for preparing such a catalyst, in which method the impregnation method according to the invention is used.

According to the invention, the said solution which contains bivalent platinum is oxidized by using, for example, hydrogen peroxide or ozone as the oxidant. Thereby the bivalent $Pt^{II}$ is oxidized to tetravalent $Pt^{IV}$, for example according to the following reaction formula:

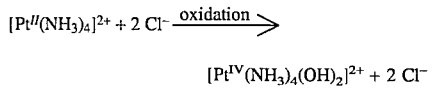

$$[Pt^{IV}(NH_3)_4(OH)_2]^{2+} + 2\ Cl^-$$

A Pt compound such as this will become chemically bonded to the alumina surface during impregnation, and the chloride will remain in the solution. The $NH_3$ released during the subsequent drying step will reduce the platinum to metallic platinum. Depending on the method of preparation of the solution, the oxidized platinum ammine solution may also contain the following tetravalent complex forms of platinum: $[Pt^{IV}(NH_3)_3(OH)_3]^+$ and $[Pt^{IV}(NH_3)_2(OH)_4]$. These also have a steric structure advantageous for chemisorption, as will be described in greater detail below.

According to one preferred embodiment of the invention, a solution containing a bivalent platinum ammine complex is first oxidized, whereby an ammine complex which contains tetravalent platinum and has OH groups is formed in the solution. There-after impregnation is carried out, preferably by the chemisorption method. In the impregnation, the ammine complexes which contain tetravalent platinum are chemically bonded to the surface of the support. Finally the catalyst is calcined at 275° C., whereby the ammonia is released and the metallic platinum is left on the surface of the support.

Considerable advantages are achieved by the method. Corrosion problems are not present, the impregnation can be carried out using chemisorption, which is a considerably advantageous impregnation method, as stated above. Furthermore, owing to the improved adsorption, less platinum is required for the impregnation. Platinum is more efficiently used when adsorbed by chemisorption.

The idea which led to the invention arose from a study investigating complexes present in various conditions (e.g. pH) in an aqueous solution of hexachloroplatinic acid, and the chemisorption of these complexes on alumina. The study showed that the steric structure of the platinum complex is a crucially important property, affecting the ability of the complex to become chemically bonded to the surface of alumina. Thus, for example, owing to its planar shape the above-mentioned $[Pt^{II}(NH_3)_4]^{2+}$ complex is not capable of being chemisorbed. When a complex such as this is oxidized according to the invention with, for example, hydrogen peroxide, a steric structure is obtained which is highly suitable for chemisorption. The structure of these complexes is described below in greater detail.

BRIEF DESCRIPTION OF THE DRAWINGS

The invention will be better understood through a more detailed examination of the structures of the Pt complexes, presented in the accompanying drawings, in which FIG. 5 depicts the structures of the chloroplatinum complexes present in the aqueous solution of hexachloroplatinic(IV) acid.

DETAILED DESCRIPTION AND PREFERRED EMBODIMENTS OF THE INVENTION

Figure 1:
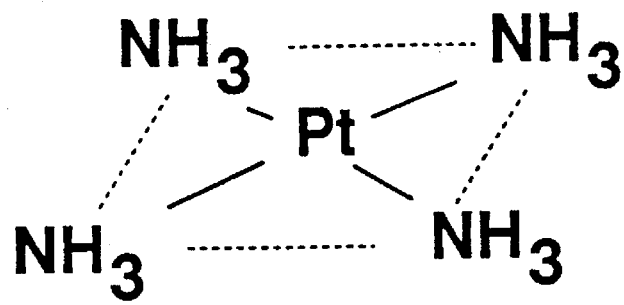
FIG. 1 depicts the structure of the $[Pt^{II}(NH_3)_4]^{2+}$ complex
Figure 2:
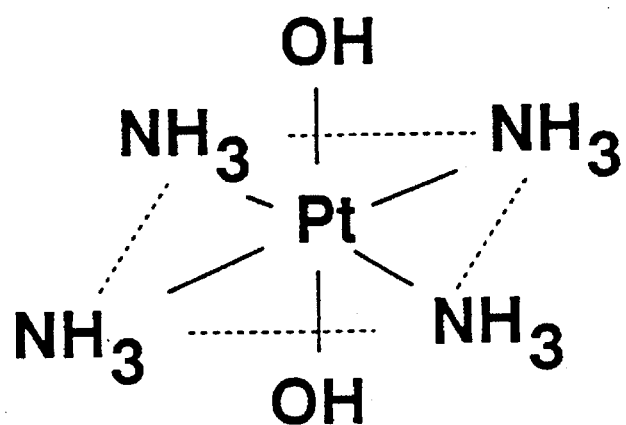
FIG. 2 depicts the structure of the $[Pt^{IV}(NH_3)_4(OH)_2]^{2+}$ complex produced in the solution by the method of the invention.
Figure 3:
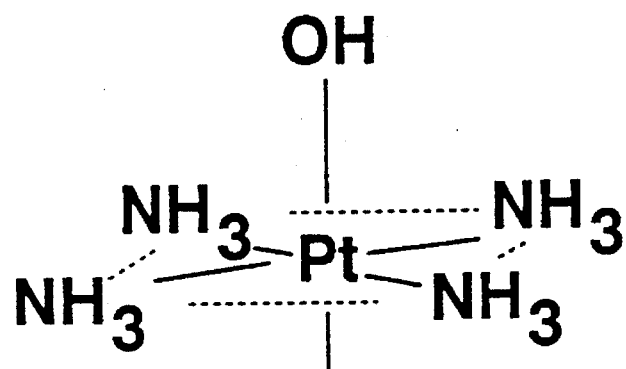
FIG. 3 depicts diagrammatically the fixation of the complex according to FIG. 2 to the surface of the support.
Figure 3:
Figure 4:
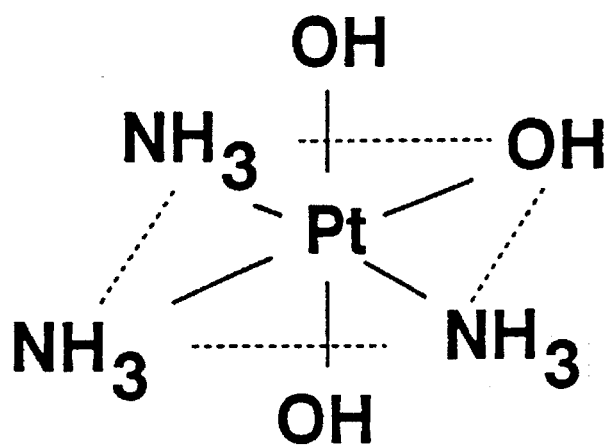
FIG. 4 depicts other complexes, $[Pt^{IV}(NH_3)_3(OH)_3]^+$ and $[Pt^{IV}(NH_3)_2(OH)_4]$, produced in the solution by the method of the invention.
Figure 4:
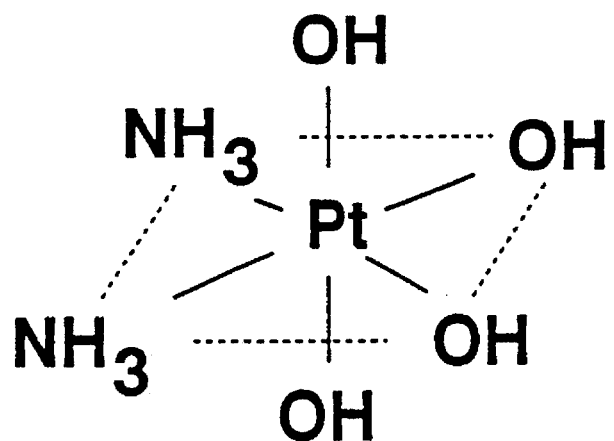

FIG. 1 shows the steric structure of the $[Pt^{II}(NH_3)_4]^{2+}$ complex. The complex is planar and square, the bivalent platinum being located in the center of the square and the ammine groups at the apexes of the square. Owing to the planarity of the complex, its chemisorption on alumina is poor. As was stated earlier, if the solution is oxidized with $H_2O_2$ or $O_3$, a $[Pt^{IV}(NH_3)_4(OH)_2]^{2+}$ complex is formed in the solution; the structure of the complex is shown in FIG. 2. An octahedral complex such as this can sterically more easily become adsorbed by the surface by mediation of the OH group in the manner depicted in FIG. 3. In the $[Pt^{IV}(NH_3)_4(OH)_2]^{2+}$ complex the OH groups are located above and below the planar square formed by the ammine groups and thereby constitute the apexes of the octahedron. In the solution there may also form complexes depicted in FIG. 4, which are also capable of bonding chemically to a surface. In these complexes one or more of the ammine groups of the planar square has been replaced by an OH group.

FIG. 5 depicts the structures of the chloroplatinum complexes present in an aqueous solution of hexachloroplatinic(IV) acid. These complexes are $[Pt^{IV}(H_2O)Cl_5]^-$, cis-$[Pt^{IV}(H_2O)_2Cl_4]$, trans-$Pt^{IV}(H_2O)_2Cl_4$, all of which contain chlorine. Thus the phenomenon observed previously, that the use of a $H_2Pt^{IV}Cl_6$ solution causes corrosion problems obtains a natural explanation. When becoming adsorbed by the support the complex brings along chloride.

EXAMPLE 1 (COMPARATIVE)

Figure 6:
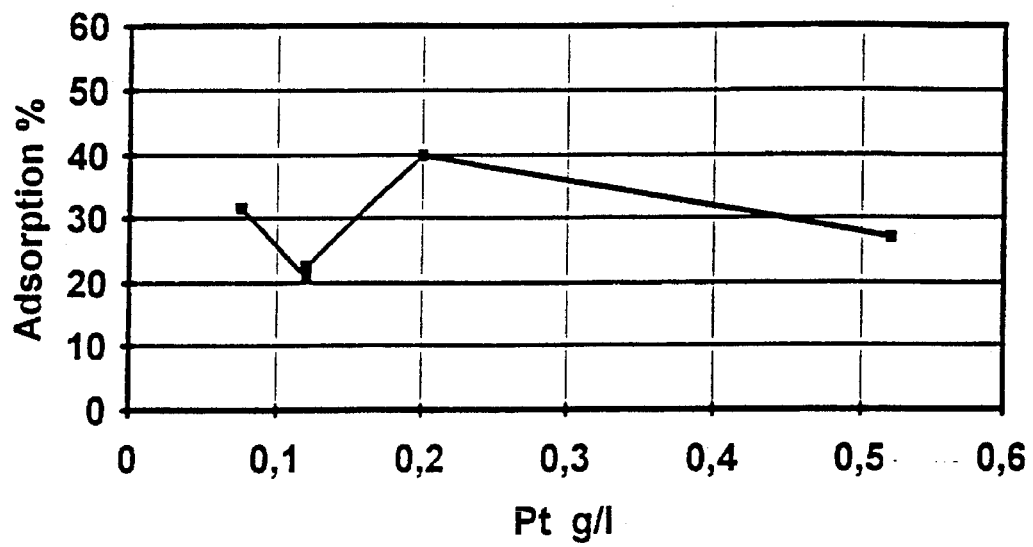
FIG. 6 depicts results of adsorption experiments in which a platinum ammine solution was used for impregnating alumina with platinum, and the oxidation according to the invention was not performed in the solutions.

For the experiment, 6 identical metal catalysts were prepared in which alumina was used as the support. The impregnation solution was prepared by dissolving a platinum(II) ammine salt in an alkaline solution. Thereafter, platinum impregnation was carried out by immersing the catalyst in the impregnation solution. The Pt concentration was analyzed both before and after the impregnation. The amount of impregnation solution used was 4 l in Experiments A1 and A2, 3 l in Experiment A3, and 1 l in Experiments A4–A6. Table 1 shows the results of these impregnation experiments. FIG. 6 depicts the adsorption percentage of platinum as a function of the Pt concentration of the solution. It can be seen that the amount of adsorbed platinum is not dependent on the concentration of the solution. In all of the experiments the amount of adsorbed platinum was of almost the same order of magnitude, i.e. 0.35–0.44% platinum in the support. The explanation for this is that the adsorbed complex form has filled all the adsorption sites and, even if the adsorbing form were available in the solution, it will not "find room" on the surface.

TABLE 1

Results of the adsorption of Pt ammine solutions having different Pt concentrations by an alumina-based support.

| Sample/ volume | Pt (g/l) before | Pt (g/l) after | % of Pt in support | Adsorption % |
|---|---|---|---|---|
| A1/4 l | 0.076 | 0.052 | 0.42 | 31.6 |
| A2/4 l | 0.12 | 0.095 | 0.44 | 20.8 |
| A3/3 l | 0.12 | 0.093 | 0.36 | 22.5 |
| A4/1 l | 0.20 | 0.12 | 0.35 | 40.0 |
| A5/1 l | 0.20 | 0.11 | 0.40 | 45.0 |
| A6/1 l | 0.52 | 0.38 | 0.27 | 26.9 |

EXAMPLE 2

Figure 7:
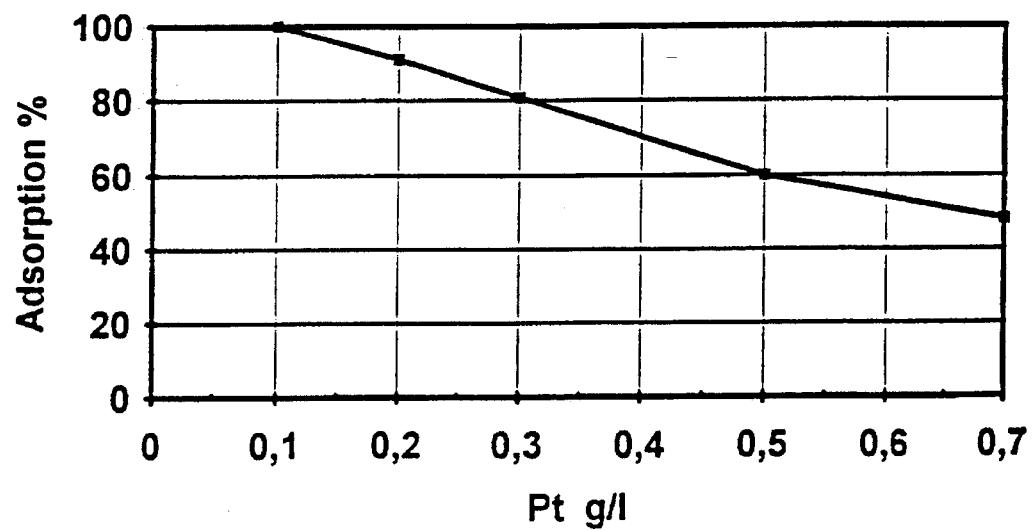
FIG. 7 depicts results of adsorption experiments in which a platinum ammine solution was used for impregnating alumina with platinum, and the oxidation according to the invention was performed in the solutions.

5 identical metal catalysts were prepared with alumina as the support. The impregnation solution was prepared by dissolving platinum(II) ammine salt in an alkaline solution. Thereafter the solution was oxidized by adding 20 ml (50%) of $H_2O_2$ to a solution having a volume of approx. 1 l. Thereafter, platinum impregnation was performed by immersing the catalyst in the impregnation solution. The Pt concentration was analyzed both before and after the impregnation. The amount of impregnation solution was 1 l in all the experiments. Table 2 shows the results of these impregnation experiments. FIG. 7 shows the adsorption percentage as a function of the Pt concentration. It can be seen that, when the Pt solution is oxidized before the adsorption, it is possible to cause a sufficient amount of platinum to be adsorbed by the support from a dilute solution.

TABLE 2

Results of the adsorption of oxidized Pt ammine solutions having different Pt concentrations by an alumina-based support.

| Sample/ volume | Pt (g/l) before | Pt (g/l) after | % of Pt in support | Adsorption % |
|---|---|---|---|---|
| B1/1 l | 0.1 | <0.01 | 0.63 | 100 |
| B2/1 l | 0.2 | 0.018 | 1.15 | 91 |
| B3/1 l | 0.3 | 0.058 | 1.52 | 81 |
| B4/1 l | 0.5 | 0.20 | 1.85 | 60 |
| B5/1 l | 0.7 | 0.264 | 2.11 | 48 |

EXAMPLE 3

A catalyst was prepared in which the support on metal foil was alumina and which contained rhodium 0.037%. Thereafter the catalyst was impregnated with platinum by chemisorption by using the procedure according to the invention, presented in Example 2. After the impregnation the catalyst was dried, calcined and reduced. The platinum concentration obtained for the catalyst was Pt 0.21%. In the testing performed on the catalysts, light-off temperatures of 107° C. for CO, 192° C. for $NO_x$ and 135° C. for HC were obtained. The values obtained for conversions at 400° C. were respectively 97%, 100% and 100%. The invention is not limited to the examples described above but may be varied within the limits defined in the accompanying claims. Thus the support used in the catalyst may also be substances other than alumina. It is also possible to use a support in which one component is alumina.

I claim:

1. A method for impregnating catalyst support with platinum, the support containing alumina, in which method a platinum-containing solution is prepared by using a compound containing bivalent platinum, characterized in that the method comprises a stage during which the said platinum-containing solution is oxidized in order to form a solution which contains tetravalent platinum and from which the platinum is adsorbed on the support, wherein said compound containing bivalent platinum is a platinum(II) ammine complex.

2. A method according to claim 1, characterized in that hydrogen peroxide or ozone is used for the oxidation.

3. A method according to claim 1, characterized in that the solution which contains tetravalent platinum contains a platinum(IV) ammine hydroxo complex.

4. A method according to claim 1, characterized in that the impregnation is carried out by chemisorption.

5. A method for preparing a catalyst which comprises an alumina-containing support impregnated with platinum, characterized in that the support is treated with a solution which contains tetravalent platinum and from which the platinum is adsorbed on a support and which is prepared by oxidizing a solution of a compound containing bivalent platinum, whereafter there follow drying and calcination under conditions where the tetravalent platinum adsorbed on the support is reduced to metallic platinum, wherein said compound containing bivalent platinum is a platinum(II) ammine complex.

6. A method according to claim 5, characterized in that the impregnation solution contains a platinum(IV) ammine hydroxo complex.

7. A catalyst which comprises an alumina-containing support impregnated with platinum, characterized in that it has been prepared by the method according to claim 5.

8. A method for impregnating catalyst support with platinum, the support consisting essentially of alumina, in which method a platinum-containing solution is prepared by using a compound containing bivalent platinum, characterized in that the method comprises a stage during which the said platinum-containing solution is oxidized in order to form a solution which contains tetravalent platinum and from which the platinum is adsorbed on the support, wherein said compound containing bivalent platinum is a platinum(II) ammine complex.

9. A method for preparing a catalyst which consists essentially of alumina-containing support impregnated with platinum, characterized in that the support is treated with a solution which contains tetravalent platinum and from which the platinum is adsorbed on the support and which is prepared by oxidizing a solution of a compound containing bivalent platinum, whereafter there follow drying and calcination under conditions where the tetravalent platinum adsorbed on the support is reduced to metallic platinum, wherein said compound containing bivalent platinum is a platinum(II) ammine complex.

* * * * *